US010613544B2

(12) United States Patent
Guterman et al.

(10) Patent No.: US 10,613,544 B2
(45) Date of Patent: Apr. 7, 2020

(54) UNIVERSAL AUTONOMOUS ROBOTIC DRIVING SYSTEM (71) Applicant: B.G. Negev Technologies and Applications Ltd., Beer Sheva (IL)

(72) Inventors: Hugo Guterman, Beer Sheva (IL); Oded Yechiel, Rishon LeZion (IL)

(73) Assignee: B. G. NEGEV TECHNOLOGIES AND APPLICATIONS LTD., Beer Sheva (IL)

( * ) Notice: Subject to any disclaimer, the term of this patent is extended or adjusted under 35 U.S.C. 154(b) by 196 days.

(21) Appl. No.: 15/571,331

(22) PCT Filed: May 2, 2016

(86) PCT No.: PCT/IL2016/050453
§ 371 (c)(1),
(2) Date: Nov. 2, 2017

(87) PCT Pub. No.: WO2016/178213
PCT Pub. Date: Nov. 10, 2016

(65) Prior Publication Data
US 2018/0284801 A1    Oct. 4, 2018

Related U.S. Application Data (60) Provisional application No. 62/156,911, filed on May 5, 2015.

(51) Int. Cl.
G05D 1/02       (2020.01)
B25J 9/16       (2006.01)
(Continued)

(52) U.S. Cl.
CPC .......... *G05D 1/0246* (2013.01); *B25J 9/1697* (2013.01); *B25J 11/00* (2013.01);
(Continued)

(58) Field of Classification Search
CPC .. G05D 1/0246; G05D 1/0088; G05D 1/0212; G05D 1/0268; B25J 9/1697; B25J 11/00
(Continued)

(56) References Cited

U.S. PATENT DOCUMENTS 3,435,703 A    4/1969  Allgaier
4,742,720 A    5/1988  Storck
(Continued)

FOREIGN PATENT DOCUMENTS

CN    102881156 A    1/2013
CN    104002818 A    8/2014
(Continued)

OTHER PUBLICATIONS

National Transportation Statistics 2014, U.S. Department of Transportation, Bureau of Transportation Statistics.
(Continued)

*Primary Examiner* — Thomas G Black
*Assistant Examiner* — Luat T Huynh
(74) *Attorney, Agent, or Firm* — Browdy and Neimark, P.L.L.C.

(57) ABSTRACT

A robotic system for driving a vehicle to a destination is configured for placement inside the vehicle, and it utilizes an imaging system for acquiring image data of at least a part of the interior of the vehicle and image data of external surroundings of the vehicle, and a control system for processing the image data acquired by the imaging system. The control system is configured to identify in the image data of at least part of the interior of the vehicle image data of the vehicle state indicators, and determine therefrom at least vehicle status data. The control system is adapted to determine from the image data of external surroundings road
(Continued)

status data, and analyze the vehicle status data and the road status data for generating control instructions for driving the vehicle along the road.

30 Claims, 5 Drawing Sheets

(51) Int. Cl.
  *B25J 11/00* (2006.01)
  *G01C 21/34* (2006.01)
  *G05D 1/00* (2006.01)
(52) U.S. Cl.
  CPC .......... *G01C 21/34* (2013.01); *G05D 1/0088* (2013.01); *G05D 1/0212* (2013.01); *G05D 1/0268* (2013.01); *G05D 2201/0213* (2013.01)
(58) Field of Classification Search
  USPC ........................................................ 701/1
  See application file for complete search history.

(56) References Cited

U.S. PATENT DOCUMENTS

| | | |
|---|---|---|
| 5,172,589 A | 12/1992 | Witt |
| 5,270,628 A | 12/1993 | Noguchi et al. |
| 5,363,027 A | 11/1994 | Noguchi |
| 5,394,743 A | 3/1995 | Noguchi et al. |
| 5,816,106 A | 10/1998 | Froelich |
| 5,821,718 A | 10/1998 | Shaffer et al. |
| 5,999,865 A | 12/1999 | Bloomquist et al. |
| 7,113,867 B1 | 9/2006 | Stein |
| 7,628,239 B1 | 12/2009 | Louie et al. |
| 8,051,936 B1 | 11/2011 | Hebert et al. |
| 8,078,349 B1 | 12/2011 | Prada Gomez et al. |
| 8,090,489 B2 | 1/2012 | Delean |
| 8,139,109 B2 | 3/2012 | Schmiedel et al. |
| 8,352,110 B1 | 1/2013 | Szybalski et al. |
| 8,433,470 B1 | 4/2013 | Szybalski et al. |
| 8,532,862 B2 | 9/2013 | Neff |
| 8,738,213 B1* | 5/2014 | Szybalski ............ B60W 50/14 701/28 |
| 8,788,134 B1 | 7/2014 | Litkouhi |
| 8,818,608 B2* | 8/2014 | Cullinane ............ B60W 30/00 701/23 |
| 2010/0057274 A1* | 3/2010 | Layton ................ G05D 1/0038 701/2 |
| 2010/0214411 A1 | 8/2010 | Weinmann et al. |
| 2011/0061963 A1 | 3/2011 | Farwell et al. |
| 2012/0002050 A1 | 1/2012 | Taniguchi et al. |
| 2012/0083960 A1 | 4/2012 | Zhu et al. |
| 2014/0046506 A1 | 2/2014 | Reichel et al. |
| 2014/0136414 A1* | 5/2014 | Abhyanker ............ G06Q 50/28 705/44 |

FOREIGN PATENT DOCUMENTS

| | | |
|---|---|---|
| EP | 2695797 A2 | 2/2014 |
| KR | 20130085235 A * | 7/2013 |
| KR | 20130085235 A | 7/2013 |
| WO | 13121357 A1 | 8/2013 |

OTHER PUBLICATIONS

G. Silberg et al.,"Self-driving cars : The next revolution", KPMG LLP & Center of Automotive Research., pp. 1-36 Jun. 2012.

* cited by examiner

UNIVERSAL AUTONOMOUS ROBOTIC DRIVING SYSTEM

TECHNOLOGICAL FIELD

The present invention is generally in the field of robotic driving systems.

BACKGROUND

Driving a motor vehicle is a relatively tedious, repetitive, time consuming (about 250 hours annually for an average commuter according to KPMG report on "Self-driving cars: The next revolution", 2012) and costly (in terms of manpower) task. About 93% of car accidents are caused by human error, which also renders driving motor vehicles a hazardous task. Car accidents annually claim thousands of casualties and result in tremendous costs (a few hundred billion dollars every year according to the KPMG report) associated with hospitalization, medical treatment and care, and car damages.

Robotic driving systems are being developed for replacing human drivers for various different tasks and applications, such as, for testing vehicle performance, for military operations, and suchlike. The solutions proposed heretofore are usually expensive to implement and very difficult to license/authorize for operating land vehicles.

Some automated driving systems are known from the patent literature, as described in U.S. Pat. Nos. 4,742,720, 5,172,589, 5,270,628, 5,363,027, 5,394,743, 5,816,106, 5,821,718, 7,628,239 and 8,051,936, for example. These automated driving systems, however, require a human operator for providing control and instructions to the system, in order to drive the vehicle along a predetermined track/path, and are not designed to provide a universal platform that can be used with any land/motor vehicle.

GENERAL DESCRIPTION

There is a need in the art for automated driving systems that are universal, in a sense of being capable to be mechanically coupled to any type/model of land/motor vehicle and operate its actuators (steering wheel, pedals and/or levers), for driving the vehicle towards a destination. There is also a need in the art for automated driving systems that can autonomously operate a vehicle and drive it towards a desired destination without communicating data with control and/or computerized systems of the vehicle and without human intervention in the vehicle operation tasks.

The present invention provides a low weight and low cost, easy to assemble and easy to mount, universal autonomous robotic system configured and operable to operate a land vehicle and drive it to a desired destination. The robotic system of the present invention is configured and operable to be fastened to a driver seat of any land vehicle (e.g., sedan, van, truck, tractor, and the like), is mechanically coupled to pedals, steering wheel and/or levers of the vehicle (generally referred to herein as actuators), and which continuously acquires and analyzes image data of the interior of the vehicle and of its external surroundings. The robotic system processes the acquired image data, determines therefrom vehicle and road status data, and, based on the determined vehicle and road status data, determines control operators/instructions. The control operators/instructions are then used by the system to change the states of one or more actuators of the vehicle, accordingly, in order to safely drive the vehicle along a predetermined route towards the destination.

The term actuators as used herein generally refers to mechanical controls (e.g., wheels, levers, knobs/switches, etc.) used for operating different systems of a vehicle, such as, but not limited to, a wheel steering system, a gear system, an acceleration system, a brake system, a clutch system, an engine ignition system, a vehicle lights system, a wipers system, a handbrake system, and suchlike.

The term state indicators as used herein generally refers to means indicative of a status of the vehicle, such as provided in a control panel of the vehicle (e.g., speed meter, engine temperature indicator, engine angular velocity indicator, fuel level indicator, battery charge level indicator, and suchlike).

The road status data may be indicative of external obstacles (e.g., nearby vehicles/bicycles, pedestrians, traffic islands, and suchlike) and/or traffic regulation signs/lights, identified in the acquired image of the external surroundings of the vehicle. The road status data may include additional data acquired by other sensors and/or wirelessly received (e.g., over a wireless Internet communication), such as, but not limited to, traffic loads, weather conditions, speed limitations, average vehicle speed applicable over certain road sections during certain hours of the day, and suchlike.

The vehicle status data may be indicative of the vehicle speed, motor state (temperature, angular speed), fuel and/or battery state, and the like, as identified in the acquired image of the control panel of the vehicle. Optionally, and in some embodiments preferably, some, or all, of the vehicle status data is received directly from the vehicle by connecting the robotic system to the control bus of the car (if such a bus is present) either by a wired connection, or wirelessly (e.g., CAN bus, also known as controller area network bus). The vehicle status data may include additional data acquired by other sensors and/or wirelessly fetched, such as, but not limited to, the current state (angular displacement) of the steering wheel, the current state of the pedals and/or of levers of the vehicle, battery charging history and the like.

Optionally, and in some embodiments preferably, the robotic system receives the destination from the user via a suitable input device and determines a route for driving the vehicle from its current location to the indicated destination based at least in part on navigation data obtained from an internal storage of the system, and/or obtained wirelessly from a remote data storage/service accessible over a data network. The current location of the vehicle may be determined using any suitable positioning technique (e.g., triangulation), or provided by the user (e.g., via a smart device). Preferably, the robotic system comprises a positioning system (e.g., global positioning system/GPS module), and/or an inertia measurement unit (IMU), for continuously monitoring the movement of the vehicle towards the desired destination.

In some possible embodiments visual determination techniques may be used to monitor the movement of the vehicle along the route. For example, a visual odometry process may be used to analyze a sequence of images of the external environment of the vehicle, identify one or more stationary objects in the images, determine distances of the identified stationary objects from the vehicle, and based on the determined distances determine vehicle movement as a function of time.

The route determination process may utilize additional information collected by the robotic system during the ride, such us, but not limited to, the road status data (e.g., traffic loads) and/or the vehicle status data (e.g., fuel and/or battery state). For example, and without being limiting, if the vehicle status data indicates that the fuel/battery state of the vehicle is low, the robotic system may determine a new route to the destination including one or more stops at petrol and/or battery charging/exchange stations to renew the energy resources of the vehicle. Similarly, if the road status data is indicative of traffic loads along the determined route, the robotic system may determine a new route to the destination using less loaded roads.

One inventive concept of the subject matter disclosed herein relates to a robotic system for driving a vehicle to a destination. The robotic system is configured for placement inside the vehicle and utilizes an imaging system and a control system for driving the vehicle to the destination. The system uses the imaging system to acquire image data of at least a part of the interior of the vehicle, and image data of external surroundings of the vehicle. The image data acquired by the imaging system is processed and analyzed by the control system.

The control system identifies, in the image, data of at least part of the interior of the vehicle image data of the vehicle state indicators and determines therefrom at least vehicle status data. The control system also determines road status data from the image data of external surroundings. The control system further analyzes at least one of the vehicle status data and the road status data, and, based on the analysis, generates control instructions for driving the vehicle along the road.

Preferably, an actuators manipulating system coupled to actuators of the vehicle is used to controllably change operational states of the actuators according to the control instructions generated by the control unit.

Optionally, and in some embodiments preferably, the control system receives location data indicative of a current location of the vehicle and road data, and determines a route for driving the vehicle to the destination based at least in part on the received location and road data. In some embodiments a positioning unit is used to determine the current location of the vehicle. The system may further comprise a wireless communication unit for communicating data with a remote computer system (server). The control system in some embodiments is adapted to receive at least the road data via the wireless communication unit.

In some embodiments a user interface unit is used for communicating data with a user. In possible applications the control system is adapted to receive at least the destination data via the user interface unit. Optionally, and in some embodiments preferably, the user interface unit comprises a data communication device usable for communicating data with a user device. In this way, the control system may use the data communication device of the user interface unit for receiving at least one of the location data and the road data. In a variant, an audio input device is used for receiving audible instructions from a user via the user interface unit. For example, and without being limiting, the audible instructions are indicative of at least one of the destination and vehicle operating instructions. In addition, an audio output device may be used for outputting audible information to the user via the user interface unit.

Optionally, and in some embodiments preferably, the different components of the robotic system (e.g., the imaging system, control system and actuators manipulating system) are mounted on a support member (e.g., one or more support frames) configured and operable for securing the system to a driver seat of the vehicle.

In possible embodiments the actuators manipulating system comprises at least a brake pedal manipulating system, an accelerator pedal manipulating system, and a steering wheel manipulating system. Optionally, and in some embodiments preferably, the steering wheel manipulating system is elastically coupled to the support member to permit movement of the steering wheel manipulating system in at least one of its translational axes, while preventing angular movement thereof. In possible applications the actuators manipulating system further comprises at least one lever manipulating system usable for actuating at least a gear system of the vehicle. However, the lever manipulating system may be also used to actuate the handbrake, lights, wipers, and/or other actuating knobs/switches and levers of the vehicle.

The imaging system is used in some embodiments for acquiring image data indicative of the state indicators on a control panel of the vehicle, and for acquiring front image data indicative of front side external surroundings of the vehicle. Though the imaging system may utilize a single imager unit to acquire the needed image data, in some embodiments at least two imager units are used. For example, and without being limiting, a panel imager unit is used for acquiring the image data indicative of the state indicators on the control panel of the vehicle, and a front view imager is used for acquiring the front image data indicative of front side external surroundings of the vehicle.

Optionally, and in some embodiments preferably, the imaging system also comprises a back imager unit for acquiring rear-view image data of the external surroundings of the vehicle.

In some applications the imaging system is further configured for acquiring image data indicative of at least one of left-view of the external surroundings of the vehicle and left-side rear-view reflected by a left-side mirror of the vehicle, and for acquiring image data indicative of at least one of right-view of the external surroundings of the vehicle and right-side rear-view reflected by a right-side mirror of the vehicle. For example, and without being limiting, the imaging system may utilize a left imager unit for acquiring the image data indicative of at least one of the left-view of the external surroundings of the vehicle and the left-side rear-view reflected by the left-side mirror of the vehicle, and a right imager unit for acquiring the image data indicative of at least one of the right-view of the external surroundings of the vehicle and the right-side rear-view reflected by the right-side mirror of the vehicle.

Another inventive concept of the subject matter disclosed herein relates to a method of autonomously driving a vehicle to a destination. In some embodiments the method comprises receiving image data indicative of at least of state indicators of the vehicle and of external surroundings of the vehicle, identifying in the received image data at least the states of the state indicators and objects in the external surroundings of the vehicle, and respectively generating the vehicle and road status data based on the identified states and objects, and generating the control instructions for driving the vehicle along the road based at least in part on the vehicle status data and the road status data.

Optionally, and in some embodiments preferably, the method comprises receiving location data indicative of a current location of the vehicle and determining a route to the destination based on the location data. The identifying step comprises in some embodiments detecting at least one of road lanes and road curves in the image data and generating lane data indicative thereof. The generated lane data is usable in possible applications for safely navigating the vehicle on the driven road.

The method comprises in possible embodiments tracking at least one of the identified objects and generating trajectory data indicative of a trajectory thereof. This trajectory data is usable in at least one of determining the route and generating the control instructions.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 5A to 5C schematically illustrate another possible embodiment of the robotic system, wherein

DETAILED DESCRIPTION OF EMBODIMENTS

One or more specific embodiments of the present disclosure will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, emphasis instead being placed upon clearly illustrating the principles of the invention. This invention may be provided in other specific forms and embodiments without departing from the essential characteristics described herein.

The present invention aims to provide a low weight and low cost, easy to assemble and easy to mount, robotic driving system, that can be quickly mounted on any land vehicle by an ordinary vehicle user/owner. The robotic driving system described herein is designed as a universal robotic navigation driver that can be fastened to a driver seat of any land vehicle. The robotic driving system is mechanically coupled to actuators of the vehicle using a steering wheel manipulating system, one or more pedal manipulating systems and/or or one or more levers and/or knobs manipulating systems, for operating the vehicle and driving it towards a predetermined destination. Accordingly, the present invention provides a universal system that can be placed in a driver seat of any land/motor vehicle and perform all functions customarily conducted by a human driver for operating the vehicle and driving it towards a desired destination.

An imaging system of the robotic system is used to continuously acquire image data of the external environment (surroundings) of the vehicle and of interior portions thereof. The image data acquired by the imaging system from the external environment and from the interior of the vehicle is processed and analyzed to respectively determine road status data and vehicle status data.

A control system of the robotic system is used to determine the road and vehicle status data from the acquired images and determine a driving route to a predetermined destination based at least in part on the road and/or vehicle status data, and/or navigation data obtained from an internal storage of the vehicle, and/or wirelessly from a remote data storage/server accessible over a data network. Correspondingly, the control system generates control operators/instructions for operating the manipulating systems of the robot in order to change the state of the steering wheel, pedals, and/or levers/knobs of the vehicle based at least in part on the road and vehicle status data, and the determined driving route, in order to safely drive the vehicle to the desired destination.

Figure 1A:
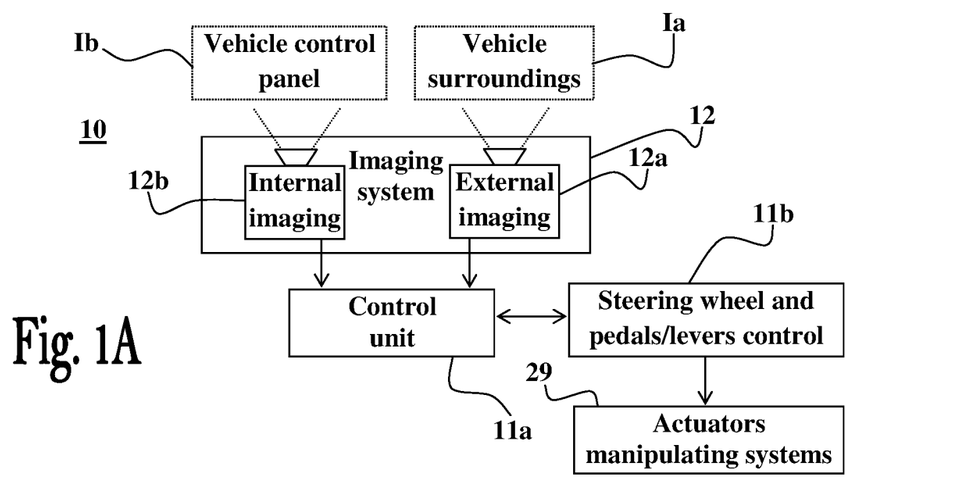
FIGS. 1A and 1B are block diagrams of a robotic driving system according to some possible embodiments.
Figure 1B:
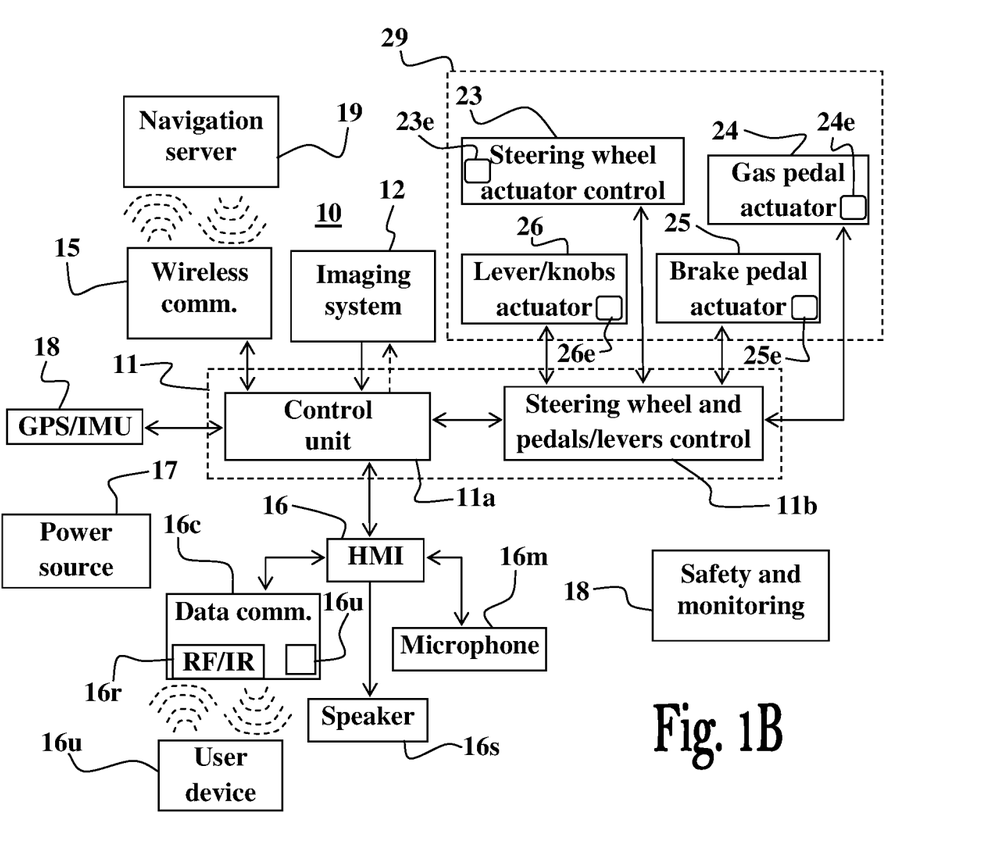

FIGS. 1A and 1B are block diagrams schematically illustrating autonomous robotic operation of a land vehicle according to some possible embodiments. FIG. 1A shows a simplified scheme of the autonomous robotic system 10 using a control unit 11a to process and analyze one or more streams of image data received from an imaging system 12. The control unit 11a is configured and operable to determine road and vehicle status data from the received streams of image data, and based at least on the determined status data generate control operators/instructions for driving/maneuvering the vehicle towards a predetermined destination. The control operators/instructions generated by the control unit 11a are used by an actuators manipulator controller 11b to operate the manipulating systems 29 to change the operational state of one or more actuators of the vehicle (e.g., accelerator pedal, brake pedal, hand brake, steering wheel, gear lever, blinker lever, wipers lever, and suchlike).

The control unit 11a may also use data received from the actuators manipulator controller 11b in the generating of the control operators/instructions. For example, and without being limiting, in some embodiments the manipulators controller 11b is configured and operable to receive state data from sensor units (e.g., encoders, not shown in FIG. 1A), provided in the actuators manipulating systems 29 and being indicative of operational states of the pedals, levers and/or knobs of the vehicle. Optionally, and in some embodiments preferably, the manipulators controller 11b is configured and operable to obtain at least part of the state data from computer/data systems of the vehicle, for example, by connecting to its data bus (e.g., CAN bus). In this way a feedback loop is obtained allowing the control unit 11a to adaptively adjust the control operators/instructions provided to the manipulators controller 11b based on the state data the manipulators controller 11b gathers from the sensor units, from the actuators manipulating systems 29, and/or from the computer/data systems of the vehicle. This configuration enables using advanced drive control schemes, for example, employing fuzzy logic and neural networks techniques for generating the control operators/instructions.

In some embodiments, the communication between the control unit 11a and the actuators manipulator controller 11b is carried out over a universal asynchronous receive/transmit (UART) connection, for high level instructions and feedback. However, any suitable serial or parallel bus based data communication (e.g., USB, CAN bus, Ethernet, WiFi) may be similarly used without departing from the scope and spirit of the present invention.

Optionally, and in some embodiments preferably, the imaging system 12 comprises at least two imaging units; an internal imaging unit 12b and an external imaging unit 12a. The internal imaging unit 12b is configured and operable to acquire images of the vehicle's interior Ib being indicative of the vehicle status e.g., comprising indicators of the control panel of the vehicle and/or showing operational states of levers, knobs and/or pedals of the vehicle. The external imaging unit 12a is configured and operable to acquire images of the vehicle's external surroundings Ia being indicative of the road status e.g., road direction, traffic signs, traffic lights, possible obstacles present on the road, and suchlike.

It is however noted that in some possible embodiments the images of the vehicle's external surroundings Ia and of the vehicle's interior Ib are acquired by means of a single imager unit. For example, and without being limiting, such a single imager unit may be configured to acquire a very wide field of view including the image data of both the external surroundings Ia and of the vehicle's interior Ib (i.e., concurrently acquiring all needed image data). Additionally or alternatively, a movable/rotatable imager unit may be used to sequentially acquire the external surroundings Ia and the vehicle's interior Ib. Additionally or alternatively, optical means (mirrors, lenses, splitters) can be used to combine the image data of external surroundings Ia and of the vehicle's interior Ib on different areas of the same imager sensor, so as to combine them into a single image frame.

In FIG. 1A, the control unit 11a is configured and operable to determine from the images Ib acquired by the internal imaging unit 12b the data indicative of the vehicle status, comprising, inter alia, vehicle velocity, temperature and angular velocity of the engine, fuel and/or battery state, operational state of pedals, lever and/or knobs of the vehicle, and suchlike. The road status data is determined by the control unit 11a from the images Ia acquired by the external imaging unit 12a, by identifying in the acquired images the direction of the road and/or lane, nearby vehicles and/or pedestrians, traffic signs, traffic lights, sidewalks and/or traffic islands. Based at least in part on the extracted road and vehicle status data the control unit 11a determines if states of the vehicle actuators need to be changed, and generates the control operators/instructions accordingly, for adjusting the vehicle actuators' states by the manipulators controller 11b.

FIG. 1B is a block diagram showing other possible embodiments of the robotic driving system 10. In this non-limiting example the manipulators controller 11b is coupled to the actuators manipulating systems 29 that comprises an accelerator pedal manipulating system 24, brake pedal manipulating system 25, steering wheel manipulating system 23, and levers/knobs actuator 26.

The levers/knobs actuator 26 is adapted for operating various buttons/knobs, keys, gear shaft, and/or handbrake, of the vehicle. In some possible embodiments, the robotic driving system 10 further comprises a clutch pedal manipulating system (not shown) configured and operable to operate a clutch pedal of the vehicle, if so needed.

The manipulators controller 11b is configured and operable to receive the control operators/instructions generated by the control unit 11a and actuate the one or more of the actuators manipulating systems 29 (23, 24, 25, and/or 26) accordingly, receive state data (e.g., angular position) from sensor units (23e, 24e, 25e and 26e, respectively) of the actuators manipulating systems 29 and transfer the same to the control unit 11a. As also seen in FIG. 1B, the data communication between the imaging system 12 and the control unit 11a may be a bi-directional data communication to allow provision of control instructions to the imaging system 12 e.g., for adjusting optical elements thereof and/or image acquisition direction of one or more imagers thereof.

A human machine interface (HMI) unit 16 may be used to input data from a user and/or to output data to the user. For example, and without being limiting, the HMI unit 16 may be configured and operable to receive audible data (e.g., indicative of the destination and/or the location data) and/or instructions (e.g., start, stop, drive, or other such instructions) from the user via an audio input device 16m (e.g., using one or more microphones), and transfer the same to the control unit 11a. The HMI unit 16 may receive output data from the control unit 11a and generate respective audible output to the user using an audio output device 16s (e.g., using one or more speakers). For this purpose the HMI unit 16 may employ any suitable voice recognition and voice generating techniques known in the art.

The HMI unit 16 may use a data communication unit 16c to communicate digital data with the user using any suitable input/output device (e.g., keypad/keyboard, pointing device, LCD/video display, touch screen or pad, or suchlike). Optionally, and in some embodiments preferably, the data communication unit 16c comprises a wireless communication device 16r for wirelessly communicating data (e.g., using optical communication, such as infrared communication, and/or radio-frequency communication, such as WiFi, Bluetooth, near field communication—NFC, Zigbee) with a user device 16u (e.g., smart device such as a tablet, smart phone, or a laptop) through the HMI unit 16. For example, and without being limiting, a smart device/phone 16u of the user may be used to provide the robotic system 10 with the destination data, and/or location data using the positioning functionalities (e.g., GPS and/or base stations triangulation) of the smart device 16u. Similarly, the smart device 16u may be also used to provide the system 10 with maps (e.g., using Google Maps™) and/or navigation data (e.g., using Waze™).

Alternatively or additionally, the data communication unit 16c may further comprise a cable connector 16u for communicating data with a user device (e.g., smart device) over a serial or parallel data communication cable (e.g., using a universal serial bus protocol—USB). The control unit 11a may be configured to receive various types of information via the cable connector 16u, such as, but not limited to, road data, map data, location data, one or more destinations, locations of petrol and/or battery charge stations, and such like.

Optionally, and is some embodiments preferably, the robotic system 10 comprises a wireless communication unit 15 for communicating data with one or more remote computer systems/servers 19 (e.g., using Internet access over WiFi or cellular network). The control unit 11a may be configured and operable to fetch the maps and/or the navigation data directly through the wireless communication unit 15. The wireless communication unit 15 may be used to fetch different types of information relevant for the driving of the vehicle to the destination, such as, but not limited to, traffic loads data, weather conditions/forecasts, locations of gasoline/charging stations, and suchlike.

Optionally, and in some embodiments preferably, as least some of the data communication (conducted through wires and/or wirelessly) performed by/with the robotic driving system 10 is encrypted in order to ensure safety and security. Any suitable encryption scheme may be utilized for this purpose, such as DES, RSA, SHA.

The robotic system 10 may also comprise a positioning system 18 using GPS and/or inertia measurement unit (IMU) for continuously determining the location of the vehicle in which the robotic system 10 is used. In this way, the control unit 11a can determine at any given time the location of the vehicle based on position/orientation data received from the positioning system 18, monitor the progress of the ride towards the destination and determine control operators/ instructions for the actuators manipulation controller 11b, accordingly. Alternatively or additionally, the position data obtained, or derived, from the positioning unit 18 may be communicated via the wireless communication unit 15 for processing and generating navigation data to the destination by a remote server/service 19.

A power source 17 of the robotic system 10 is also shown in FIG. 1B, for powering the different units/devices of the robotic system 10. An internal rechargeable battery (not shown) may be used for the power source 17, or alternatively, the robotic system 10 may be configured and operable to connect to a power supply of the vehicle.

The robotic system 10 may further comprise a safety and monitoring unit 18 configured and operable to receive and process the status data determined by the control unit 11a and the state data obtained by the actuators manipulator controller 11b from the different actuators manipulating systems, to assure that all of the units/devices of the system 10 are operating properly and safely. In some embodiments, the safety and monitoring unit 18 analyzes the input data of each unit/device being monitored to assure its validity and quality (e.g., verify the images received from the imaging system are not saturated or blocked), and assesses the output of the module to assure the obtained results are within acceptable operational ranges. If a problem is identified, the safety and monitoring unit 18 issues respective indications/alerts to the user indicating the identified problem and and/or logs the same in the system 10. For example, and without being limiting, the safety and monitoring unit 18 may be able to stop the vehicle if the identified problem is crucial. In some embodiments the safety and monitoring system 18 is configured and operable to monitor the operation of the motors (seen in FIGS. 2A and 2B) of the actuating systems and the status of the power source 17 of the system 10.

Figure 2A:
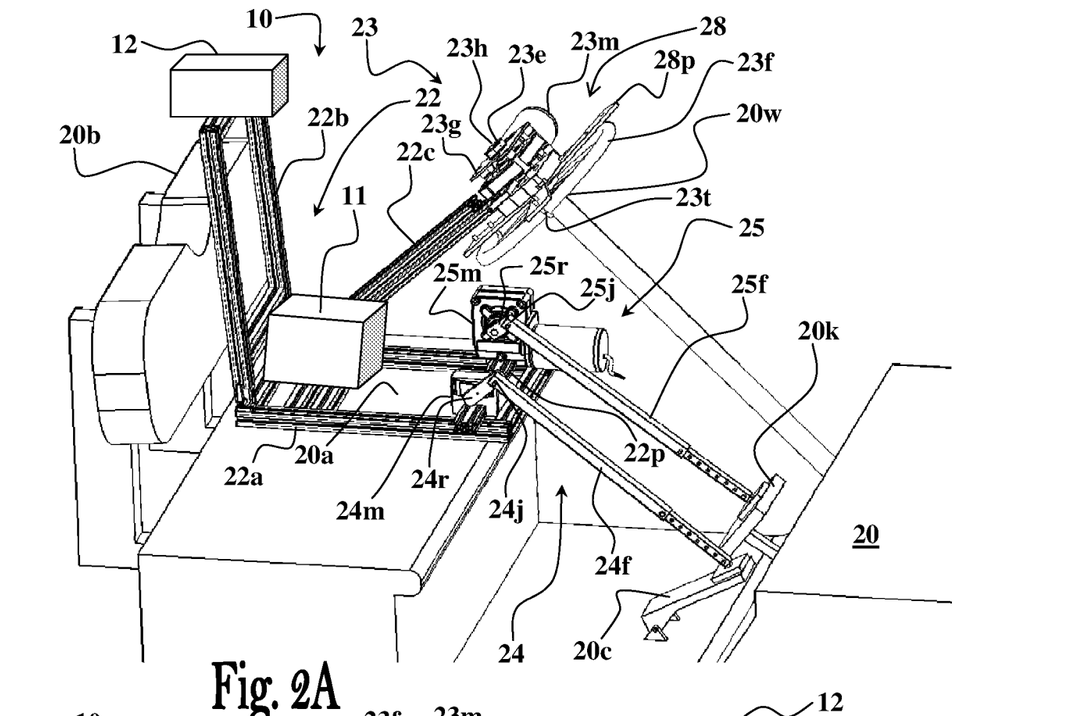
FIG. 2A to FIG. 2D schematically illustrate possible embodiments of the robotic system fastened to a driver seat of a land vehicle.
Figure 2B:
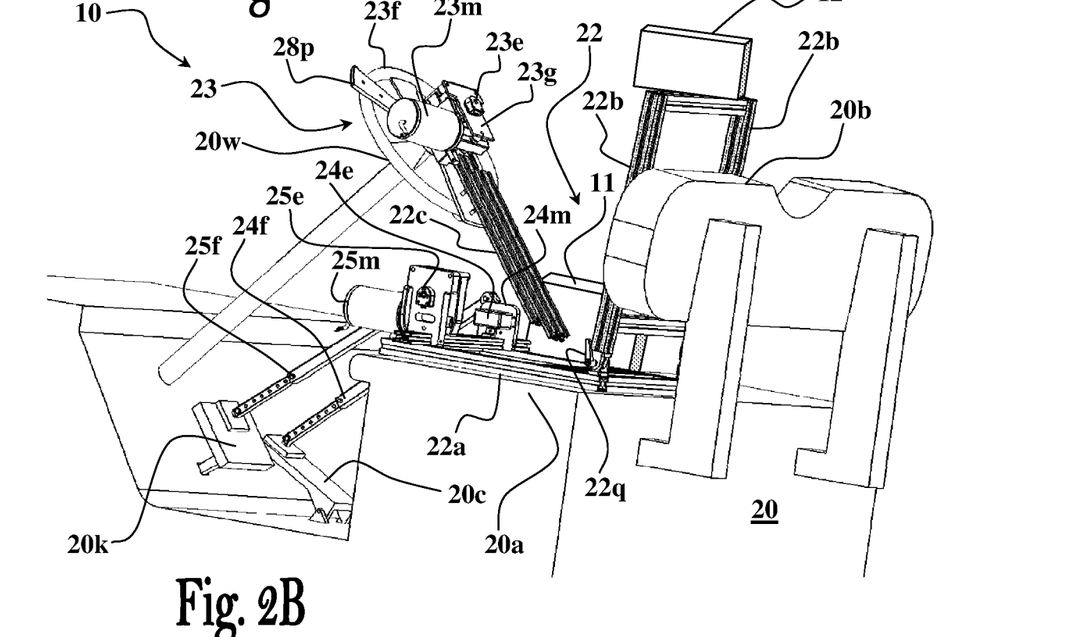

FIGS. 2A and 2B respectively show front and back perspective views of the robotic driving system 10 fastened to a driver seat 20a of a land vehicle 20, according to some possible embodiments. In this non-limiting example, the robotic system 10 is fastened to the driver seat 20a by a fastening frame 22 having a base frame 22a immovably secured to the base of the driver seat 20a, and a support frame 22b connected to the base frame 22a and immovably secured to the back support portion 20b of the driver seat 20a. A support member 22c carrying the steering wheel manipulating system 23 can be connected to the base frame 22a and/or to the support frame 22b, or to an intersection of these frames.

Optionally, and in some embodiments preferably, the base and support frames, 22a and 22b, are movably hinged one to the other, to allow angular movement of the frames one relative to other. The support member 22c may be also movably hinged to one of the frames 22a and 22b, or to their intersection, to permit angular motion of the support member 22c relative to at least one of the frames 22a and 22b. In some embodiments the support member 22c carrying the steering wheel manipulating system 23 is attached to at least one of the frames 22a and/or 22b by cables and/or straps 22s, as exemplified in FIG. 2D, thereby providing the steering wheel manipulation system 23 the strength required to hold the support member 22c while providing it with freedom of movement in the translation axes ($i_1$, $i_2$, $i_3$) and preventing rotational/angular movement thereof. A certain orientation of the frames 22a and 22b, one relative to the other, and/or of the support member 22c relative to at least one of the frames 22a and 22b, may be locked using a locking mechanism (e.g., 22q), to achieve a desired angle between the frames 22a and 22b, and a desired angle between the support member 22c and at least one of the frames 22a and 22b.

In this non-limiting example the imaging system 12 is mounted on the support frame 22b. It is however noted that in possible embodiments various imaging units of the imaging system 12 may be mounted at/on different locations of the support frame 22b, at/on different locations of the base frame 22a, and/or of the support member 22c. As also exemplified in FIGS. 2A and 2B, a control system 11 comprising the control unit 11a and the actuators manipulator controller 11b may be immovably secured to at least one of the frames 22a and 22b. However, the control units of the control system 11 may be similarly immovable attached to any one of the frames 22a and 22b and/or to the support member 22c.

The steering wheel manipulation system 23 carried by the support member 22c is attached to the steering wheel system 20w of the vehicle 20 and configured and operable to rotate the steering wheel 23f of the vehicle 20 by means of a motor 23m and gear 23g arrangements (e.g., using a worm gear rotor assembly). The steering wheel manipulation system 23 may be configured to attach and rotate the steering wheel 20w by means of a propeller structure 28 having a plurality of fin members 28p (three such fins are shown in FIGS. 2A, 2B and 2D) and is mechanically coupled to a rotatable shaft of the motor 23m via the gear system 23g. The propeller structure 28 is attached to a rotatable shaft 23h of the gear system 23g, and its fin members 28p extend therefrom radially towards the frame 23f of the steering wheel system 20w and attach to the frame 23f of the steering wheel 20w by their free ends.

The propeller structure 28 of the fin members 28p may be attached to the frame 23f of the steering wheel system 20w by any suitable clamping means e.g., using U-bolts 23t and nuts. This configuration provides a simple attachment scheme allowing the user to quickly and easily couple the wheel manipulation system 23 to the steering wheel 20w. In addition, the use of the fin members 28p of the propeller structure 28 to transfer rotary motion of the motor 23m to the frame 23f of the steering wheel system 20w is exploited to actuate the steering wheel 20w by the motor 23m while providing it some freedom to move along the translation axes $i_2$, and $i_3$ (where $i_1$ is parallel to, or coincides with, the axis of rotations $W_x$ of the wheel 230.

As exemplified in FIG. 2D, in some embodiments the support member 22c of the steering wheel manipulating system 23 is attached to at least one of the fastening frames 22 by straps and/or cables 22s. In this specific and non-limiting example the support member 22c is attached to the base frame 22a by straps 22s, however, it may be similarly attached to the support frame 22b, or to both of frames 22a and 22b. The attachment of the support member 22c by straps/cables 22s provides a flexible/resilient connection between the steering wheel manipulating system 23 and the fastening frame 22 providing it with some freedom to move along the translational axes $i_1$, $i_2$, and $i_3$ while preventing angular motion thereof. Such an attachment scheme employing cable/straps 22s thus provides the steering wheel manipulating system 23 non-rigid connection to the fastening frame 22, that permits limited motion of the motor 23m of the steering wheel manipulating system 23, and thereby resolves the problems associated with centering the rotating parts of the steering wheel system 20w and of the motor 23m, and enables reduction of the actuation forces applied by the motor 23m in order to rotate the frame 23f of the steering wheel system 20w.

FIGS. 2A and 2B also show the accelerator pedal manipulating system 24 and the brake pedal manipulating system 25, each immovably attached to the base frame 22a and comprising a movable leg mechanically coupled to the respective pedal.

The accelerator pedal manipulating system 24 comprises an electric motor 24m (e.g., servo motor) immovably attached to a support beam 22p of the base frame 22a, a rotatable lever 24r mechanically coupled to the shaft of the motor 24m and to the movable leg 24f. The movable leg 24f is hinged to the rotatable lever 24r at one end thereof, thereby forming a knee-like joint 24j, and is mechanically coupled to the accelerator pedal 20c by its free end. In this way, rotary movements of the shaft of the motor 24m, and of the lever 24r mechanically coupled to it, are translated to push or pull actuations of the accelerator pedal 20c by the movable leg 24f coupled to it.

Similarly, the brake pedal manipulating system 25 comprises an electric motor 25m (e.g., a worm gear motor) immovably attached to the support beam 22p of the base frame 22a, and a rotatable lever 25r mechanically coupled to the shaft of the motor 25m and to the movable leg 25f. The movable leg 25f is hinged to the rotatable lever 25r at one end thereof, thereby forming a knee-like joint 25j, and is mechanically coupled to the brake pedal 20k by its free end. In this way, rotary movements of the shaft of the motor 25m, and of the lever 25r mechanically coupled to it, are translated to push or pull actuations of the accelerator pedal 20c by the movable leg 25f coupled to it.

Figure 2C:
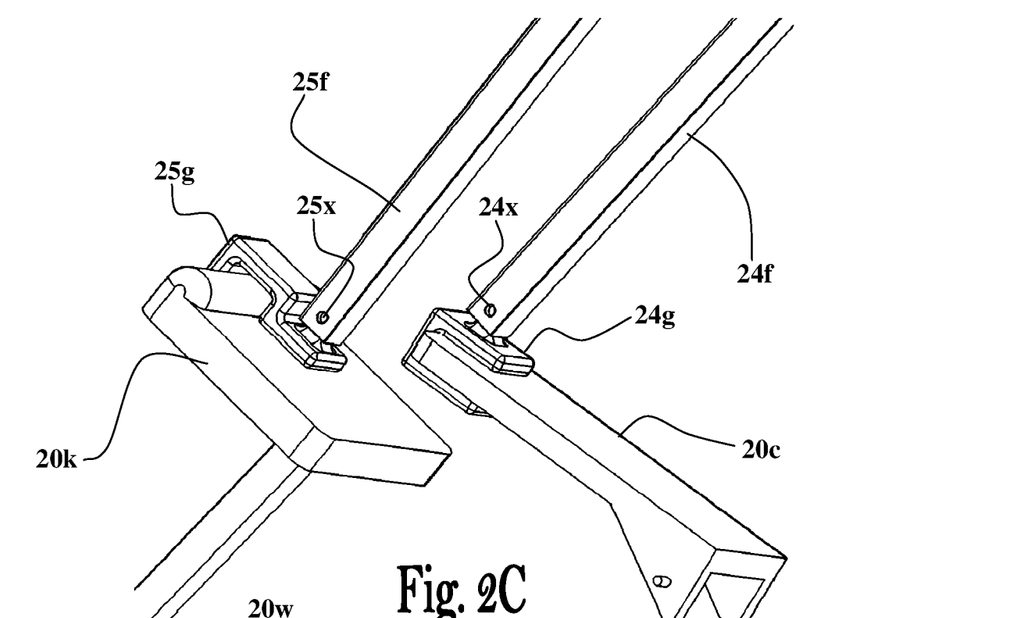
Figure 2D:
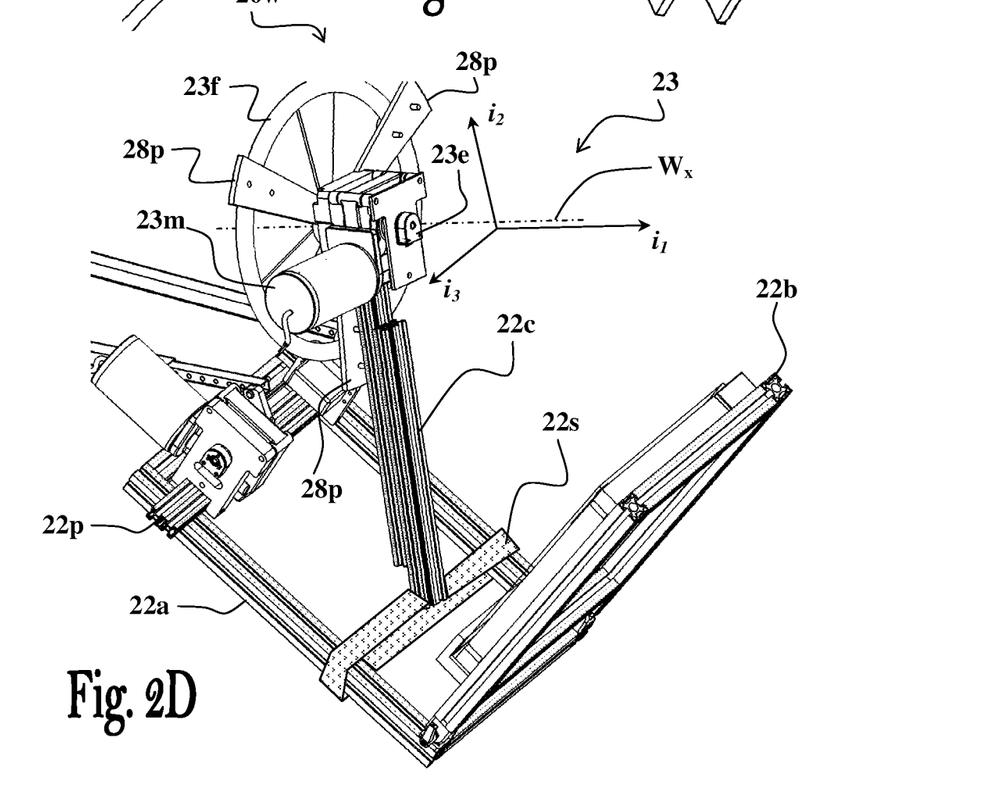

Referring now FIG. 2C, in some embodiments the movable legs 24f and 25f are coupled to their respective pedals, 20c and 20k, using 'C'-shaped coupling members (or clamps), 24g and 25g respectively, configured to wrap around at least some portion of the pedal and be rigidly secured thereto e.g., using securing bolts. As seen, in this non-limiting examples the legs 24f and 25f are hinged to their respective 'C'-shaped coupling members 24g and 25g, forming simple joint structures 24x and 25x for permitting angular movement between the legs 24f and 25f and their respective coupling members 24g and 25g.

In this non-limiting example the vehicle 20 is a type of electric vehicle operable by a limited number of actuators, comprising the accelerator pedal 20c, the brake pedal 20k, and a steering wheel 20w. Therefore, lever manipulating system(s) (e.g., for operating a gear system of the vehicle) and clutch manipulating system, are not required, and are not shown in FIGS. 2A and 2B. However, such manipulating systems can be easily implemented using mechanisms such as used in the manipulating systems 24 25 and/or 23 described and illustrated herein. Similarly, the robotic driving system 10 may comprise one or more such manipulating systems for operating various buttons/knobs, keys, gear shaft, and/or handbrake, of the vehicle. Thus, the robotic driving system 10 can be easily adapted for mounting in any manual or automatic vehicle.

It is noted that the embodiments of the robotic system 10 depicted in FIGS. 2A and 2B are designed for use with a right-hand traffic/drive vehicle. It should be clear that this is not a limitation on the present invention, and the robotic system 10 may be similarly configured to operate the controls of a left-hand traffic/drive vehicle, as well.

Figure 3:
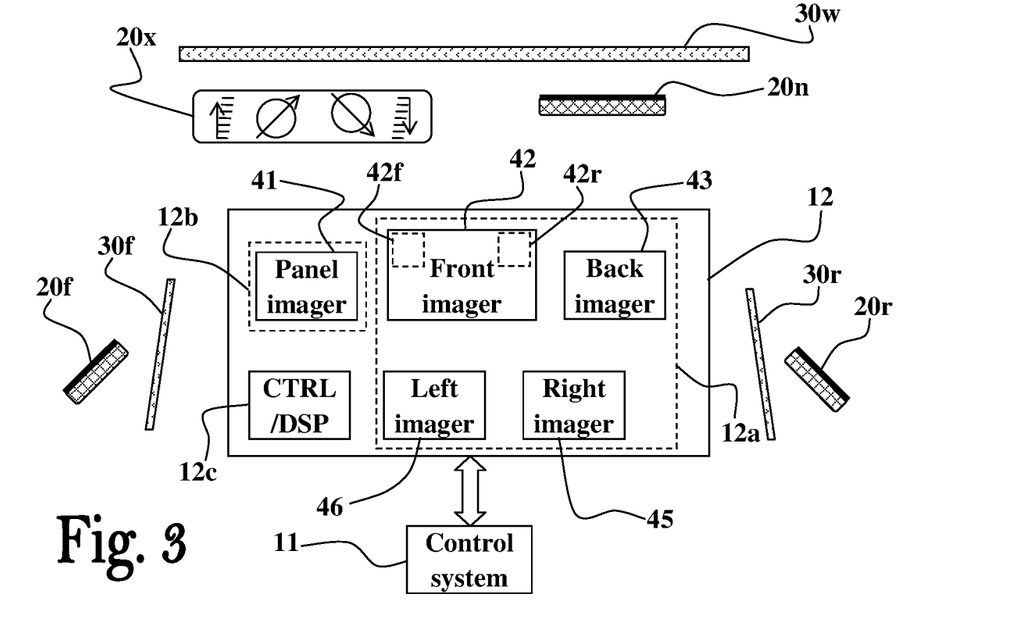
FIG. 3 is a block diagram of an imaging system according to some possible embodiments.

FIG. 3 is a block diagram showing the imaging system 12 according to some possible embodiments. In this non-limiting example the internal imaging unit 12b of the imaging system 12 comprises a panel imaging unit 41, comprising one or more imagers configured and operable to acquire images of the control panel 20x of the vehicle 20 (only one imaging unit 41 is shown in FIG. 3). The external imaging unit 12a of the imaging system 12 comprises a front imaging unit 42 comprising one or more imagers configured and operable to acquire front-view images of the external surroundings of the vehicle e.g., as seen through the windshield 30w of the vehicle, a back imaging unit 43 for acquiring rear-view images of the external surroundings of the vehicle e.g., as seen via the rear-view mirror (windshield mirror) 20n of the vehicle.

Alternatively, in some embodiments, the imaging system 12 employs movable/rotatable imager units capable of sequentially acquiring image data from various different fields of view (FOV) e.g., using PAN-TIL mounted cameras, Omni directional cameras, standard cameras or a combination thereof. Alternatively or additionally, the imaging system 12 may comprise optical means (e.g., lenses, mirrors, splitters) for allowing it to concurrently collect and combine image data from various different FOVs onto different areas of the same imager sensor. In this way the number of imagers of the imaging system 12 may be substantially reduced. For example, in certain embodiments a single imager unit is used to collect the images of the control panel 20x and the front-view images of the external surroundings of the vehicle.

In some embodiments the external imaging unit 12a of the imaging system 12 further comprises a left side imaging unit 46 for acquiring left-side-view images of the external surroundings of the vehicle e.g., as seen through the driver side window 30f, and/or left-side-rear-view images e.g., as seen via the left-side-view mirror 20f of the vehicle. Similarly, a right side imaging unit 45 may be used for acquiring right-side-view images of the external surroundings of the vehicle e.g., as seen through the front passenger side window 30r, and/or right-side-rear-view images e.g., as seen via the right-side-view mirror 20r of the vehicle.

Optionally, and in some embodiments preferably, the front imaging unit 42 utilizes stereoscopic imaging techniques using two imagers 42f and 42r for determining locations of objects imaged by the front imaging unit 42 in a three-dimensional space (i.e., for adding depth information). In some possible embodiments, such stereoscopic imaging techniques may be employed by the other imaging units, such as the left and right sides imaging units, 46 and 45. The imaging units of the imaging system 12 may be implemented using any type of any suitable imager such as, but not limited to, Point Grey's FLEA3 1.3 MPix 30 FPS color GigE camera. In some embodiments, however, a single imager unit is used in the imaging system 12 to acquire all needed image data (i.e., of the control panel 20x, the front-view images, the rear-view images, the left-side-view images, and the right-side-view images), utilizing a rotatable/movable imager, and/or optical means for expanding the FOV of the image and/or for concurrently combining the different image data on different sensor areas of imagers.

The imaging system 12 may include one or more control and/or processing units 12c configured and operable to receive the images acquired by the imagers of the imaging units, 41, 42, 43, 45 and/or 46, and transfer them to the control system 11 for processing. In some possible embodiments the control/processing units 12c of the imaging system 12 may comprise image processing hardware and/or software configured and operable to process and analyze the images acquired by the imaging units and determine the external and internal status data needed by the control system 11 for generating the control operators/instructions for driving the vehicle.

Figure 4:
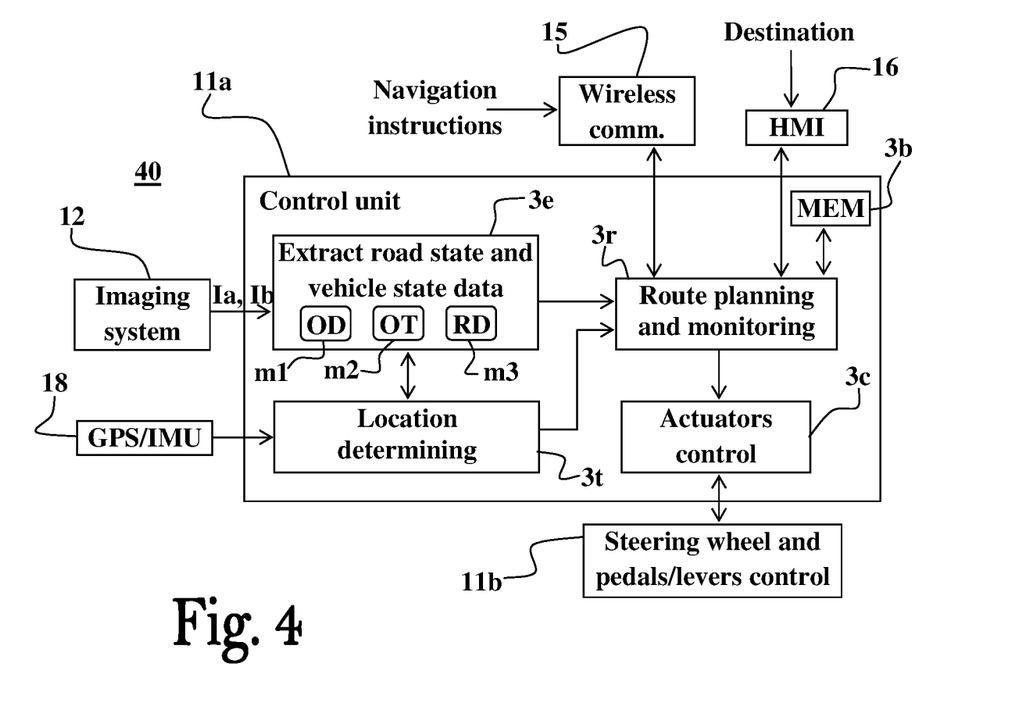
FIG. 4 is a block diagram exemplifying a control scheme according to some possible embodiments.

FIG. 4 is a block diagram 40 exemplifying components and functions of the control unit 11a according to some possible embodiments. In this non-limiting example the control unit 11a utilizes a location determination module 3t for determining the location (e.g., global earth localization and/or on a road map) of the vehicle based on position/ orientation data received from the positioning system 18, and generating location data indicative thereof. If the positioning system 18 comprises both a GPS and an IMU unit, the position/orientation data from these units may be fused/combined in the location determination module 3t for improving the accuracy and understanding of real world position of the vehicle, and thereby improving precision of the generated location data. For example and without being limiting, Kalman filters may be used at least in part for generating the location data based on the position/orientation data generated by the GPS and/or IMU units.

An image processing module 3e of the control unit 11a is used for determining the road and/or vehicle status data from the image data (Ia and Ib) received from the imaging system 12. A route planning and monitoring module 3r of the control unit 11a is used for generating a route, monitoring the progress of the ride along the generated route, and for decision making based at least in part on the location data generated by the positioning system 18 and the road and/or vehicle status data generated by the image processing module 3e. The route planning and monitoring module 3r further generates driving instructions (e.g., accelerate/decelerate, stop vehicle, turn left or right, change lane, and suchlike) based at least in part on the received location data and the road and/or vehicle status data. The driving instructions generated by the planning and monitoring module 3r are used by an actuators control module 3c of the control unit 11a for generating the control operators/instructions used by the actuators manipulator controller 11b to operate the manipulating systems.

The route planning and monitoring module 3r may be configured and operable to monitor the progress of the ride along the generated route based at least in part on the location data generated by the location determination module 3t, the road/map and/or navigation data received from a remote database/server (19) via the wireless communication unit 15, the road and/or vehicle status data received from the image processing unit 3e.

In some possible embodiments the road/map and/or navigation data is fetched from a memory/storage unit 3b (e.g., magnetic/optical disk, Flash memory, or suchlike) of the control unit 11a. Similarly, a predetermined destination for the ride may be fetched from the memory/storage unit 3b and used by the route planning and monitoring module 3r for generating the route. Accordingly, in some possible embodiments the robotic driving system 10 may be implemented without the wireless communication unit 15.

In some possible embodiments the image processing module 3e comprises at least an object detection (OD) component m1, an object tracking (OT) component m2, and a road/lane detection (RD) component m3, used for generating at least some portions of the road and vehicle status data (e.g., utilizing vision/mapping algorithms). The object detection component m1 is configured and operable to identify objects (e.g., vehicles/bicycles, pedestrians, traffic signs/lights/islands, sidewalks, control panel indicators, and suchlike) in the image data received from the imaging system 12, and generate object data indicative thereof. The object data generated by the object detection component m1 is essential for driving the vehicle safely to the destination and preventing accidents and/or incidents. The object tracking component m2 is configured and operable to anticipate the trajectory of the various objects identified by the object detection component m1, and generate trajectory data indicative thereof. The road/lane detection component m3 is configured and operable to detect lanes and the road curves in the image data received from the imaging system, and generate lane data indicative thereof. The lane data generated by the road/lane detection component m3 is used by the robotic driving system 10 to navigate safely on the driven roads, and is required in order to maintain the vehicle in a road lane, to permit lane switching, if needed, and to take road turns.

The object data, trajectory data and lane data, from the image processing unit 3e is provided to the path planning/monitoring unit 3r, wherein it is used for determining a safe route for the vehicle to drive in.

Figures 5A, 5B, 5C:
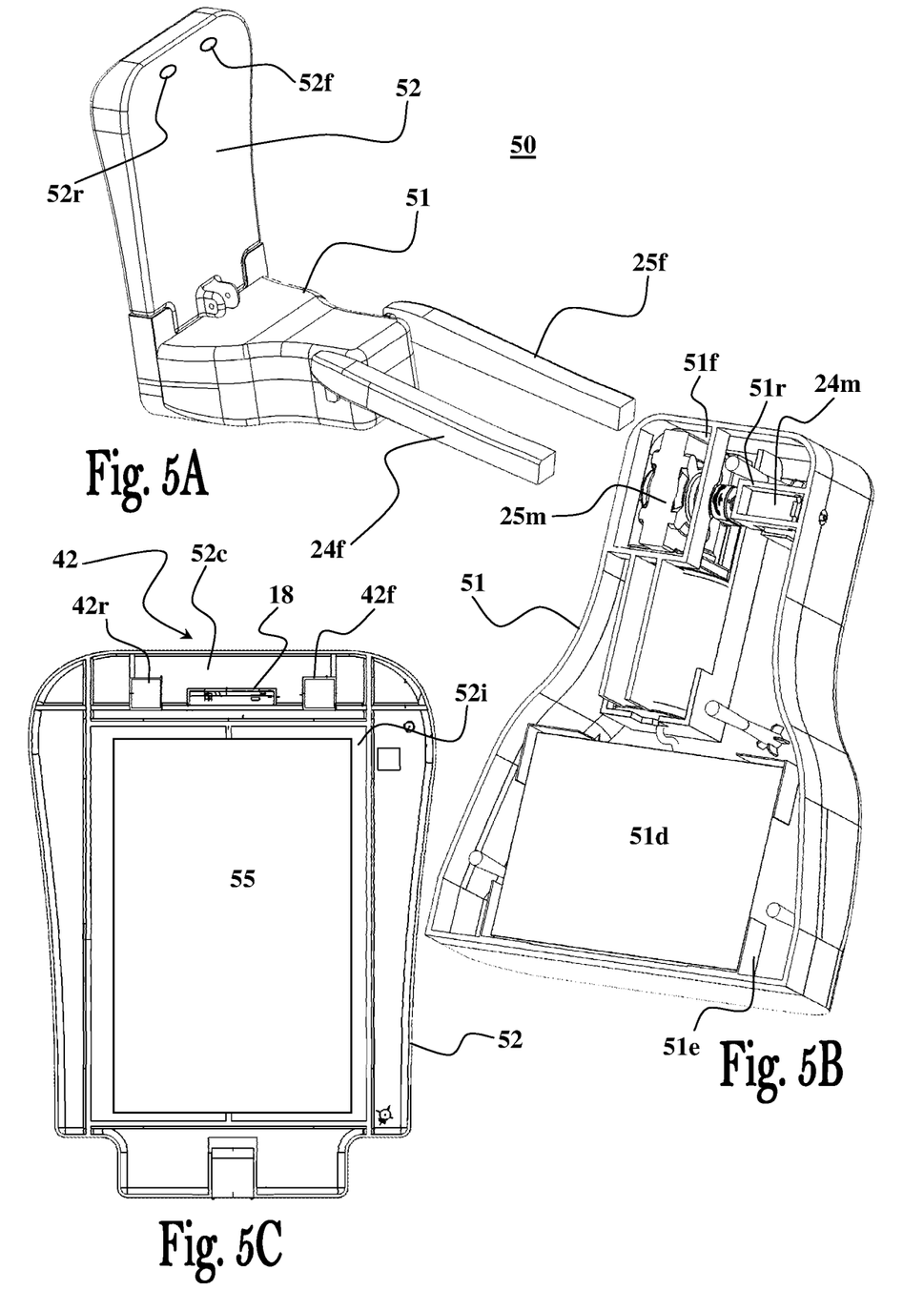
FIG. 5A is a perspective view of the system.
FIG. 5B is a sectional view of the base assembly of the system.
FIG. 5C is a sectional view of a vertical support assembly of the system.

FIG. 5A shows a robotic system 50 according to some possible embodiment, and FIGS. 5B and 5C show sectional views of a base assembly 51 and of a vertical support assembly 52 of the system 50. With reference to FIG. 5A, the base assembly 51 is configured to be securely attached to the driver seat, and the vertical support assembly 52 is configured to be securely attached to the back support of the driver seat. In some embodiments the vertical support assembly 52 is pivotally hinged to the base assembly 51.

As seen in FIG. 5A, the vertical support assembly 52 comprises two apertures 52r and 52f at upper portion thereof serving as light entrance apertures for the front imaging unit 42. Referring now to FIG. 5C, the vertical support assembly 52 comprises an upper compartment 52c used for housing the imaging unit 42 and the positioning system 18. More particularly, the imagers 42f and 42r of the imaging unit 42 are mounted at the sides of the upper compartment 52c in alignment with the apertures 52r and 52f, and the positioning system 18 is positioned therebetween. An intermediate compartment 52i is used for housing a computer system 55 (e.g., a laptop) of the system, configured to implement functions of the control system and imaging system/DSP described hereinabove.

FIG. 5B shows a sectional view of the base assembly 51, comprising a front support frame 51f configured to receive and hold the electric motor 25m, a front support frame 51r configured to receive and hold the electric motor 24m, and rear support frame 51e configured to receive and hold circuitry drivers 51d of the electric motors 24m and 25m, and of other elements of the system shown in FIG. 2.

As described hereinabove and shown in the associated figures, the present invention provides a universal robotic driving system 10/50 configured and operable for installation inside any land/motor vehicle for autonomously driving the vehicle to a desired/predetermined destination, and related methods. As will be appreciated the robotic driving system of the present invention provides a simple solution for transforming any vehicle into an autonomous vehicle, which may be advantageously utilized for various different applications, such as, but not limited to, agriculture, transportation, mining, cleaning, routine patrol, delivery, and for assisting handicapped/incapacitated, elderly, vision impaired and sleepy drivers.

The different modules of the control unit 11a described hereinabove may be implemented in some embodiments as software and/or hardware modules, or a combination thereof. Functions of the robotic driving system 10/50 described hereinabove may be controlled through instructions executed by a computer-based control system which may be housed in the control system 11. A control system suitable for use with embodiments described hereinabove may include, for example, one or more processors connected to a communication bus, one or more volatile memories (e.g., random access memory—RAM) or non-volatile memories (e.g., Flash memory). A secondary memory (e.g., a hard disk drive, a removable storage drive, and/or removable memory chip such as an EPROM, PROM or Flash memory) may be used for storing data, computer programs or other instructions, to be loaded into the computer system.

For example, computer programs (e.g., computer control logic) may be loaded from the secondary memory into a main memory for execution by one or more processors of the control system 11. Alternatively or additionally, computer programs may be received via a communication interface. Such computer programs, when executed, enable the computer system to perform certain features of the present invention as discussed herein. In particular, the computer programs, when executed, enable a control processor to perform and/or cause the performance of features of the present invention. Accordingly, such computer programs may implement controllers of the computer system.

In an embodiment where modules and/or units of the robotic driving system 10/50 are implemented using software, the software can be stored in a computer program product and loaded into the computer system using the removable storage drive, the memory chips or the communications interface. The control logic (software), when executed by a control processor, causes the control processor to perform certain functions of the invention as described herein.

In another embodiment, features of the modules and/or units of the robotic driving system 10/50 are implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s). In yet another possible embodiment, features of the invention can be implemented using a combination of both hardware and software.

While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the invention.

The invention claimed is:

1. A robotic system for driving a vehicle to a destination, the robotic system comprising:
    a support configured for easily and quickly securing said robotic system to a driver seat of the vehicle;
    an imaging system configured and operable to acquire image data of at least a part of the interior of the vehicle, and image data of external surroundings of the vehicle; and
    a control system configured and operable to
       process and analyze the image data acquired by the imaging system, to identify in the image data of the at least apart of the interior of the vehicle, image data of the vehicle state indicators and determine therefrom at least vehicle status data of said vehicle,
       determine from the image data of external surroundings, road status data, and
       analyze said at least vehicle status data and said road status data for generating control instructions for operating actuators of the vehicle and driving the vehicle along said road accordingly.

2. The system of claim 1, further comprising an actuators manipulating system configured and operable to couple to the actuators of the vehicle and to controllably change operational states thereof according to the control instructions generated by the control system.

3. The system of claim 2, wherein the support comprises a base assembly configured to accommodate the actuators manipulating system and to be secured to the driver seat of the vehicle.

4. The system of claim 3, wherein the actuators manipulating system comprises at least a brake pedal manipulating system, an accelerator pedal manipulating system, and a steering wheel manipulating system.

5. The system of claim 4, wherein the steering wheel manipulating system is elastically coupled to the support to permit movement of the steering wheel manipulating system in at least one of its translational axes.

6. The system of claim 4, wherein the actuators manipulating system further comprises at least one lever manipulating system configured and operable to actuate at least a gear system of the vehicle.

7. The system of claim 1 wherein the control system is configured and operable to receive location data indicative of a current location of the vehicle and road data, and determine a route for driving the vehicle to the destination based at least in part on said location and said road data.

8. The system of claim 7 comprising a positioning unit configured and operable to determine the current location of the vehicle.

9. The system of claim 7 comprising a wireless communication unit configured and operable for data communication with a remote computer system for receiving at least the road data via said wireless communication unit.

10. The system of claim 1, comprising a user interface unit for data communication with a user.

11. The system of claim 10 wherein the user interface unit comprises a data communication device configured and operable for communicating data with a user device, for receiving at least one of the location data and the road data via the data communication device.

12. The system of claim 10, comprising an audio input device for receiving audible instructions from a user via the user interface unit, said audible instructions being indicative of at least one of the destination and vehicle operating instructions.

13. The system of claim 10 comprising an audio output device for outputting audible information to the user via the user interface unit.

14. The system of claim 1, wherein the imaging system is configured for acquiring image data indicative of the state indicators on a control panel of the vehicle, and acquiring front image data indicative of front side external surroundings of the vehicle.

15. The system of claim 14, wherein the imaging system comprises at least two imager units, comprising: a panel imager unit for acquiring said image data indicative of the state indicators on the control panel of the vehicle, and a front view imager for acquiring said front image data indicative of front side external surroundings of the vehicle.

16. The system of claim 14, wherein the imaging system comprises a back imager unit for acquiring rear-view image data of the external surroundings of the vehicle.

17. The system of claim 14, wherein the imaging system is further configured for acquiring image data indicative of at least one of left-view of the external surroundings of the vehicle and left-side rear-view reflected by a left-side mirror of the vehicle, and for acquiring image data indicative of at least one of right-view of the external surroundings of the vehicle and right-side rear-view reflected by a right-side mirror of the vehicle.

18. The system of claim 17, wherein the imaging system comprises a left imager unit for acquiring said image data indicative of at least one of left-view of the external surroundings of the vehicle and left-side rear-view reflected by the left-side mirror of the vehicle, and a right imager unit for acquiring said image data indicative of at least one of right-view of the external surroundings of the vehicle and right-side rear-view reflected by the right-side mirror of the vehicle.

19. The system of claim 1 wherein the support comprises a vertical support assembly configured and operable for accommodating the imaging and control systems and for securing the same to a back support of the driver seat of the vehicle.

20. A computer-implemented method of autonomously driving a vehicle to a destination, the method comprising:
   securing a support of a robotic system to a driver seat of the vehicle;
   using one or more processors and memories of said robotic system to carry out the following:
      receiving image data from an imaging system of the robotic system, said imaging data being indicative of at least the state indicators of the vehicle and of external surroundings of the vehicle;
      identifying in the received image data at least the states of said state indicators and objects in the external surroundings of the vehicle, and respectively generating vehicle status data and road status data based on the identified indicators states and the external objects; and
      generating control instructions based at least in part on said vehicle status data and said road status data for operating actuators of the vehicle and driving the vehicle to said destination.

21. The method of claim 20 comprising receiving location data indicative of a current location of the vehicle and determining a route to the destination based on said location data.

22. The method of claim 20 wherein the identifying comprises detecting at least one of road lanes and road curves in the image data and generating lane data indicative thereof usable for navigating the vehicle on the driven road.

23. The method of claim 20 comprising tracking at least one of the identified objects and generating trajectory data indicative of a trajectory thereof, and using said trajectory data in at least one of the route determining and the generating of the control instructions.

24. A robotic system for driving a vehicle to a destination, said robotic system comprising a support configured and operable for easily and quickly securing said robotic system to a driver seat of the vehicle, said support comprising:
   an imaging system configured and operable to acquire image data of external surroundings of the vehicle; and
   a control system is configured and operable to process and analyze the image data and determine therefrom road status data, analyze said road status data, and generate control instructions based thereon for operating actuators of the vehicle and driving the vehicle to the destination.

25. The system of claim 24 comprising a positioning unit configured and operable to determine the current location of the vehicle.

26. The system of claim 25 comprising a wireless communication unit configured and operable for data communication with a remote computer system for receiving at least road data via said wireless communication unit.

27. The system of claim 24 comprising a wireless communication unit configured and operable for data communication with a remote computer system for receiving at least the road data via said wireless communication unit.

28. The system of claim 24, wherein the imaging system is configured for acquiring image data indicative of state indicators on a control panel of the vehicle, and wherein the control system is configured and operable to process the image data indicative of the vehicle state indicators and determine therefrom at least vehicle status data of said vehicle.

29. The system of claim 24 wherein the imaging system is configured and operable to acquire front-view and rear-view image data of the external surroundings of the vehicle.

30. The system of claim 24 wherein the imaging system is configured for acquiring image data indicative of at least one of left-view of the external surroundings of the vehicle and left-side rear-view reflected by a left-side mirror of the vehicle, and for acquiring image data indicative of at least one of right-view of the external surroundings of the vehicle and right-side rear-view reflected by a right-side mirror of the vehicle.

* * * * *